United States Patent

Pazdirek et al.

(10) Patent No.: US 6,398,446 B1
(45) Date of Patent: Jun. 4, 2002

(54) BALL JOINT COMPONENTS AND METHODS FOR MAKING SAME

(75) Inventors: George Pazdirek, Schaumburg; Ernst Matthew Gaertner, Arlington Heights; Victor Almgren, Chicago, all of IL (US)

(73) Assignee: Mac Lean-Fogg Company, Wheeling, IL (US)

( * ) Notice: Subject to any disclaimer, the term of this patent is extended or adjusted under 35 U.S.C. 154(b) by 0 days.

(21) Appl. No.: 09/255,979

(22) Filed: Feb. 23, 1999

Related U.S. Application Data

(63) Continuation-in-part of application No. 08/977,176, filed on Nov. 24, 1997, now abandoned.

(51) Int. Cl.[7] ................................ F16C 11/06
(52) U.S. Cl. ................. 403/134; 403/122; 403/131; 403/135
(58) Field of Search ................ 403/133, 134, 403/135, 140, 122, 128, 131, 56, 76, 77, 90; 277/316

(56) References Cited

U.S. PATENT DOCUMENTS

| | | |
|---|---|---|
| 1,919,797 A | 7/1933 | Maurer |
| 1,986,149 A | 1/1935 | Harris |
| 2,010,367 A | 8/1935 | Lapsley |
| 2,157,401 A * | 5/1939 | Craver ............... 403/131 |
| 2,197,037 A | 4/1940 | Gardner |
| 2,369,091 A | 2/1945 | Venditty |
| 3,023,038 A | 2/1962 | White |
| 3,147,537 A | 9/1964 | Fadow |
| 3,250,556 A | 5/1966 | Couch et al. |
| 3,269,758 A | 8/1966 | Ulderup et al. |
| 3,350,122 A | 10/1967 | Ulderup |
| 3,465,405 A | 9/1969 | Sullivan |
| 3,537,734 A | 11/1970 | Gottschald et al. |
| 3,583,775 A | 6/1971 | Potter et al. |
| 3,591,669 A | 7/1971 | Memory |
| 3,677,585 A * | 7/1972 | Scheerer ............... 403/140 |
| 3,693,999 A | 9/1972 | Wood, Jr. |
| 3,941,495 A | 3/1976 | Duncan |
| 4,024,616 A | 5/1977 | McCloskey |
| 4,116,504 A | 9/1978 | Cass |
| 4,201,400 A | 5/1980 | Hoogenbosch |
| 4,290,181 A | 9/1981 | Jackson |
| 4,360,284 A | 11/1982 | Brandenburg |
| 4,386,869 A * | 6/1983 | Smith ............... 403/134 X |
| 4,435,101 A | 3/1984 | Sugiyama et al. |
| 4,447,094 A | 5/1984 | Trudeau et al. |
| 4,537,524 A | 8/1985 | Hanson |
| 4,572,693 A | 2/1986 | Nemoto |
| 4,679,958 A | 7/1987 | Mizusawa et al. |
| 4,695,182 A | 9/1987 | Wood, Jr. |
| 4,758,110 A | 7/1988 | Ito |

(List continued on next page.)

FOREIGN PATENT DOCUMENTS

| | | |
|---|---|---|
| DE | 2 264 236 | 7/1973 |
| DE | 25 55 731 | 6/1976 |
| DE | 195 22 336 A1 | 12/1995 |

(List continued on next page.)

*Primary Examiner*—Harry C. Kim
(74) *Attorney, Agent, or Firm*—Brinks Hofer Gilson & Lione

(57) ABSTRACT

A ball joint assembly includes a multiple part ball stud that is press fit together and then assembled with a ball socket. The ball socket is ultrasonically welded to a ball joint housing, and the ball joint housing is assembled to a heated link to form a strong mechanical joint therebetween. The weld joint between the ball socket and the housing is positioned near the bottom of the ball socket, away from high stress areas of the housing. An annular seal is adhered between an inwardly facing portion of the housing and an outwardly facing portion of the ball stud to heremetically seal the joint.

28 Claims, 6 Drawing Sheets

U.S. PATENT DOCUMENTS

| | | | |
|---|---|---|---|
| 4,797,019 A | | 1/1989 | Wood, Jr. |
| 4,901,395 A | * | 2/1990 | Semrau .................. 277/316 X |
| 4,954,006 A | | 9/1990 | Suzuki et al. |
| 5,009,538 A | | 4/1991 | Shirai et al. |
| 5,011,320 A | | 4/1991 | Love et al. |
| 5,011,321 A | | 4/1991 | Kidokoro |
| 5,022,313 A | | 6/1991 | Shontz et al. |
| 5,066,159 A | | 11/1991 | Urbach |
| 5,092,703 A | | 3/1992 | Kobayashi |
| 5,116,072 A | | 5/1992 | Swenson |
| 5,150,981 A | | 9/1992 | Miwa |
| 5,152,628 A | | 10/1992 | Broszat et al. |
| 5,163,769 A | | 11/1992 | Dresselhouse |
| 5,163,772 A | | 11/1992 | Wood |
| 5,178,482 A | * | 1/1993 | Wood ..................... 403/140 X |
| 5,267,805 A | | 12/1993 | Ueno et al. |
| 5,312,200 A | * | 5/1994 | Buhl et al. .................. 403/134 |
| 5,352,059 A | * | 10/1994 | Ueno et al. ............. 403/134 X |
| 5,380,114 A | | 1/1995 | Urbach |
| 5,417,512 A | | 5/1995 | Chamberlin |
| 5,427,467 A | | 6/1995 | Sugiura |
| 5,492,428 A | | 2/1996 | Hellon et al. |
| 5,611,635 A | | 3/1997 | Schütt et al. |
| 5,615,967 A | | 4/1997 | Hellon |
| 5,678,947 A | | 10/1997 | Urbach et al. |
| 5,782,573 A | | 7/1998 | Dorr et al. |
| 6,109,816 A | * | 8/2000 | Iwasaki ...................... 403/135 |
| 6,139,788 A | * | 10/2000 | Dorr .......................... 264/263 |
| 6,152,641 A | * | 11/2000 | Rabe .......................... 403/134 |

FOREIGN PATENT DOCUMENTS

| | | | | |
|---|---|---|---|---|
| DE | 196 25 351 C1 | | 11/1997 | |
| EP | 0 027 770 | | 4/1981 | |
| EP | 0 163 296 | | 12/1985 | |
| EP | 0 411 777 A3 | | 2/1991 | |
| EP | 0411 777 A2 | | 2/1991 | |
| EP | 0 549 383 A1 | | 6/1993 | |
| EP | 0 612 926 A1 | | 8/1994 | |
| EP | 0 918 168 A1 | | 5/1999 | |
| FR | 2 670 255 | | 6/1992 | |
| GB | 604 383 | | 7/1948 | |
| GB | 817027 | * | 7/1959 | ................. 403/134 |
| GB | 954690 | * | 4/1964 | ................. 403/134 |
| GB | 970292 | * | 9/1964 | ................. 403/134 |
| GB | 1 005 682 | | 9/1965 | |
| GB | 1033969 | * | 6/1966 | ................. 403/134 |
| GB | 1049887 | * | 11/1966 | ................. 403/134 |
| GB | 1 580 182 | | 11/1980 | |
| WO | WO 82/01227 | | 4/1982 | |

* cited by examiner

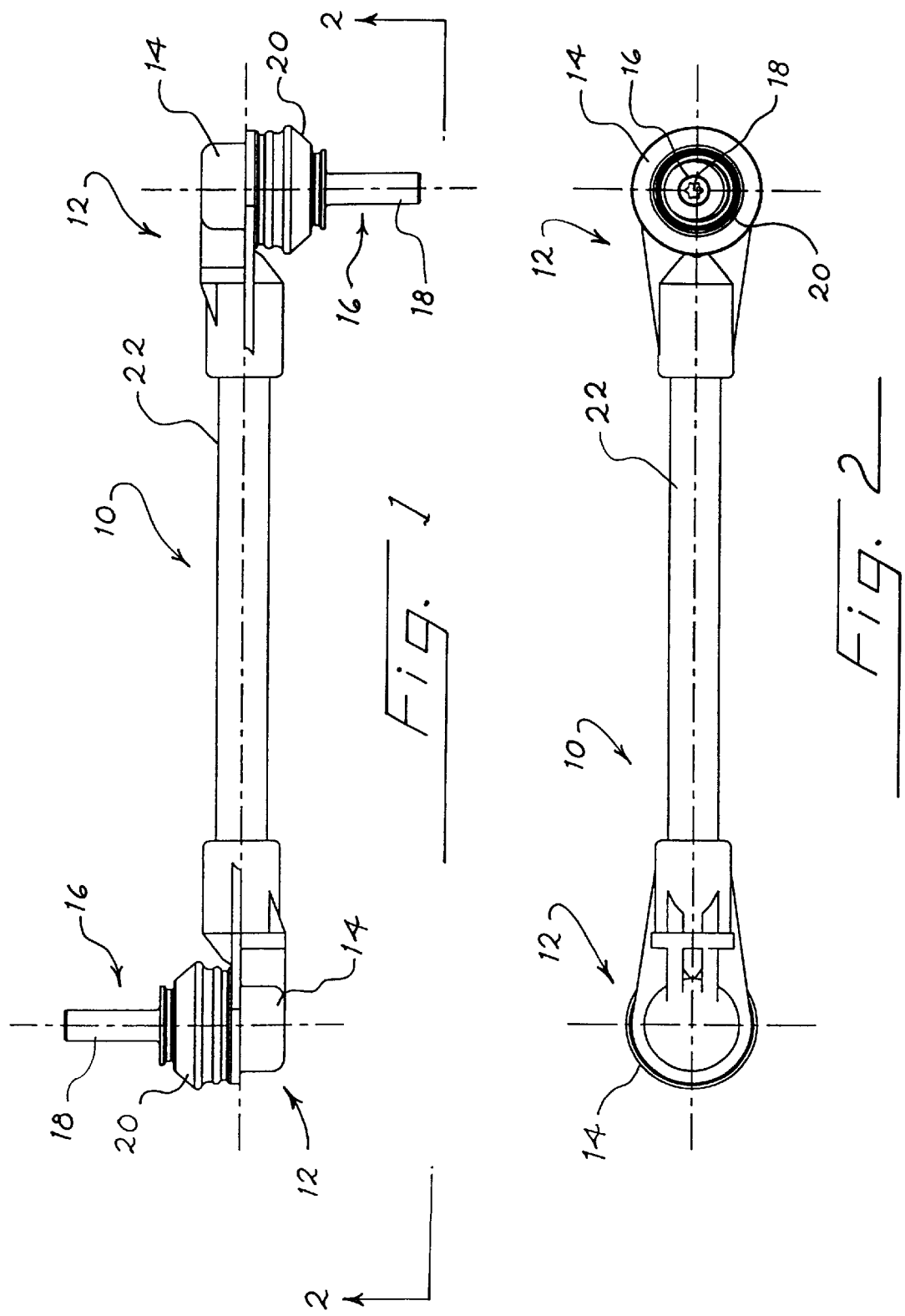

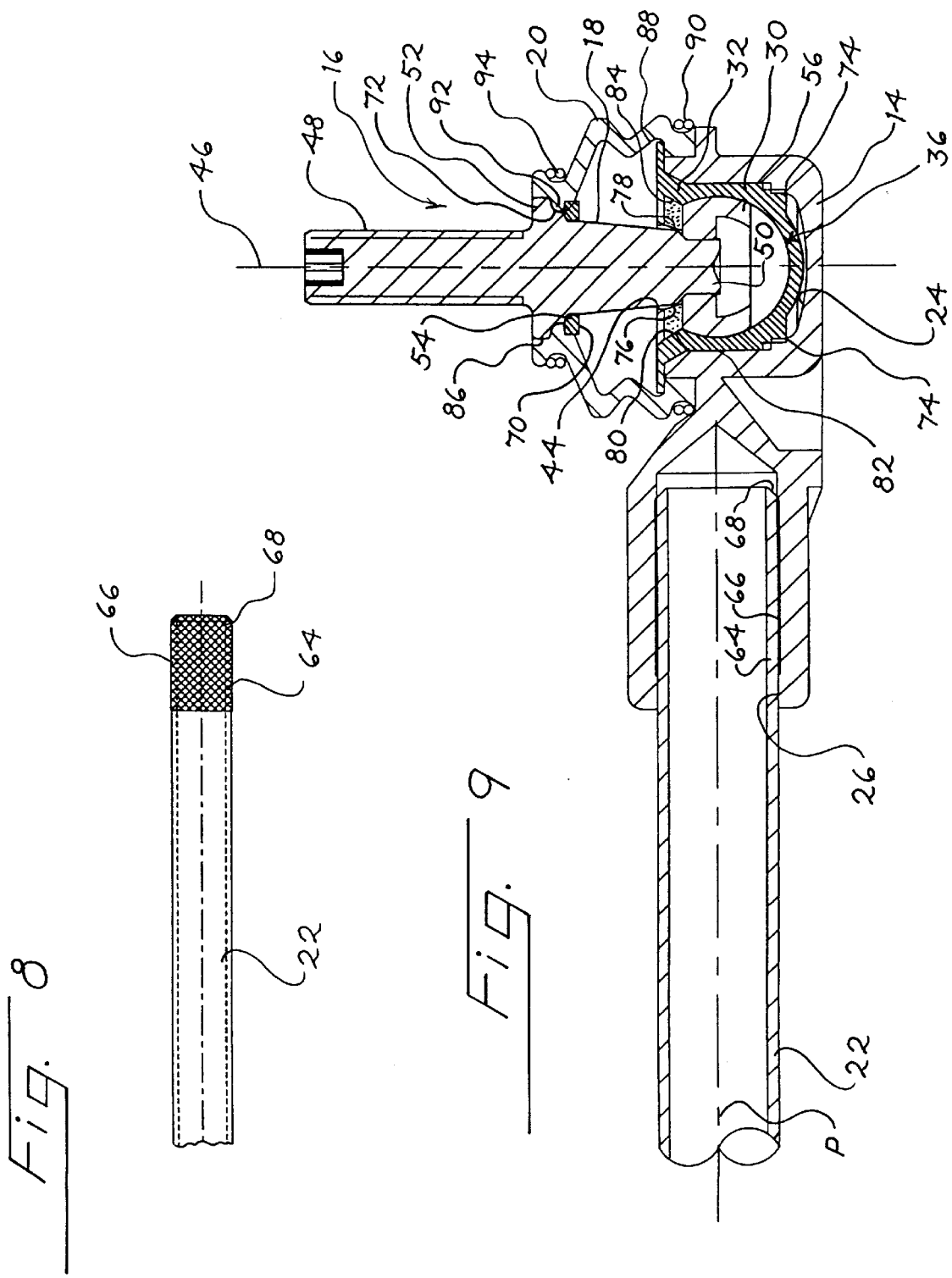

_BALL JOINT COMPONENTS AND METHODS FOR MAKING SAME_

CROSS REFERENCE TO RELATED APPLICATION

This application is a continuation in part of U.S. patent application Ser. No. 08/977,176 filed Nov. 24, 1997, now abandonded. The entirety of this parent application is hereby incorporated by reference.

BACKGROUND

The present invention relates to ball joints, such as ball joints used in automotive suspension systems.

There has been considerable activity towards the development of ball joints that are inexpensive, light in weight and reliable. Sugiyama U.S. Pat. No. 4,435,101 and Broszat U.S. Pat. No. 5,152,628 disclose ball joint links utilizing polymeric housings that are typically injection molded.

White U.S. Pat. No. 3,023,038 discloses a ball stud that employs a ball that is separately formed from and then assembled on the stud.

Hellon U.S. Pat. No. 5,492,428, assigned to the assignee of the present invention, discloses a ball joint assembly that uses a threaded collar and a staked washer to provide a retention feature for a boot that extends from the ball stud to the ball joint housing.

SUMMARY

The preferred embodiments described below include a number of improvements over the prior art of the previous section. These improvements will be described in detail below. Here, by way of introduction it can be said that the improvements relate to a new sealing approach that differs from the conventional boot, to a new housing/ball socket assembly that is secured together in a way that provides strength advantages, to a new ball stud/ball assembly that provides high strength and cost advantages, to a new ball joint housing/link assembly that provides cost and strength advantages, and to a new approach for retaining a boot on a ball stud that again provides cost advantages.

This section has been intended by way of introduction only, and is not intended to limit the scope of the following claims.

BRIEF DESCRIPTION OF THE DRAWINGS

FIG. 1 is a side view of a ball joint link that incorporates a preferred embodiment of the present invention.

FIG. 2 is a top view taken along line 2—2 of FIG. 1.

FIG. 8 is a side view of a portion of the link included in the embodiment of FIG. 1.

FIG. 9 is a cross-sectional view of one end of the ball joint link of FIG. 1.

DETAILED DESCRIPTION OF THE PRESENTLY PREFERRED EMBODIMENTS

Figure 3:
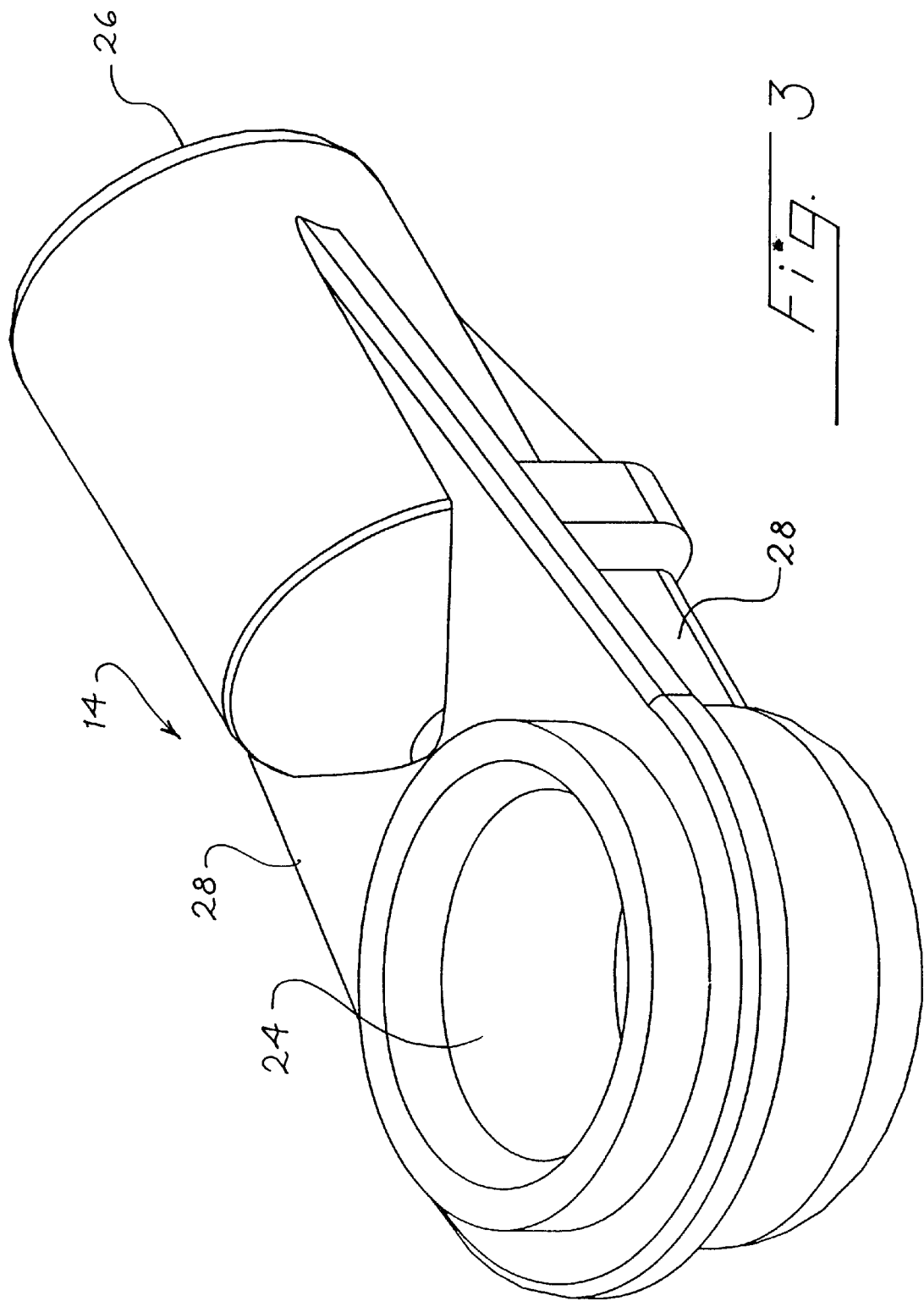
FIG. 3 is a perspective view of one of the ball joint housings included in the embodiment of FIG. 1.

Turning now to the drawings, FIGS. 1 and 2 show two views of a ball joint assembly 10 that incorporates a preferred embodiment of this invention. The assembly 10 includes a ball joint 12 mounted at each end of a link 22. Each ball joint 12 comprises a respective housing 14 and ball stud 16. The ball stud 16 is described in greater detail below, but in FIGS. 1 and 2 it can be seen that each ball stud 16 includes a stem 18 that includes a threaded portion extending outwardly from the respective housing 14. Each ball stud 16 is mounted to articulate over a prescribed range with respect to the housing 14, and a boot 20 is secured between the ball stud 16 and the housing 14 to protect the ball joint 12 from grit and other contamination. The following paragraphs will describe major component parts of the assembly 10, before turning to a discussion of the manner in which these parts cooperate and are assembled.

FIG. 3 shows a perspective view of the housing 14, which defines a first cavity 24 and a second cavity 26. Preferably the housing 14 is injection molded from a high strength thermoplastic material. The housing 14 includes ribs 28 that provide structural strength.

Figure 4:
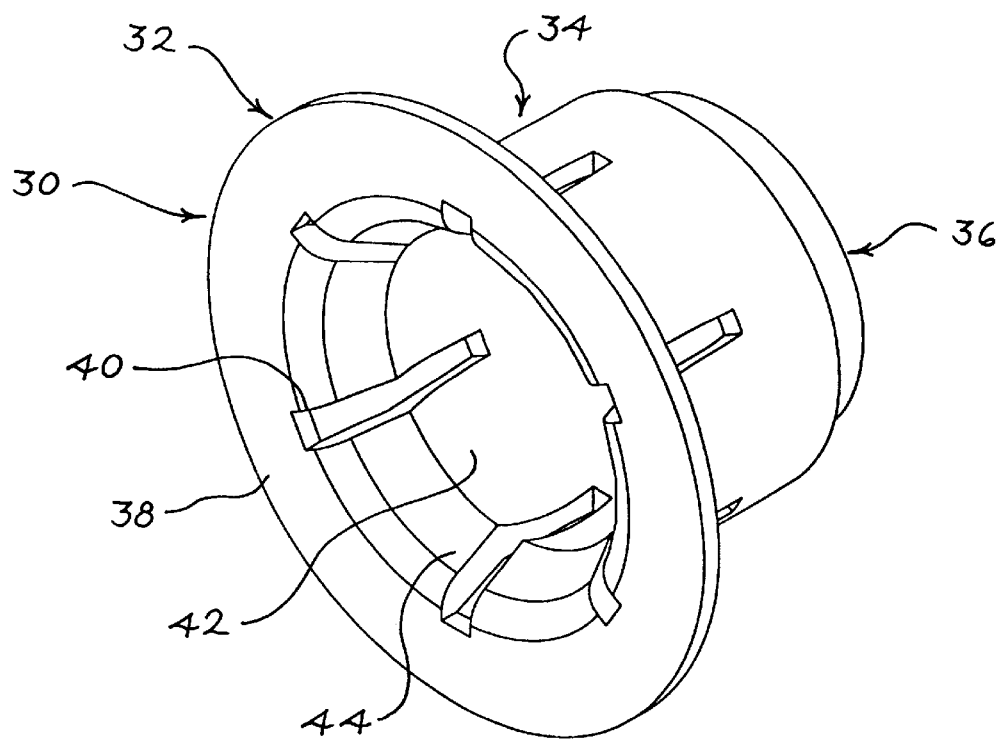
FIG. 4 is a perspective view of one of the ball sockets included in the embodiment of FIG. 1.
Figure 5:
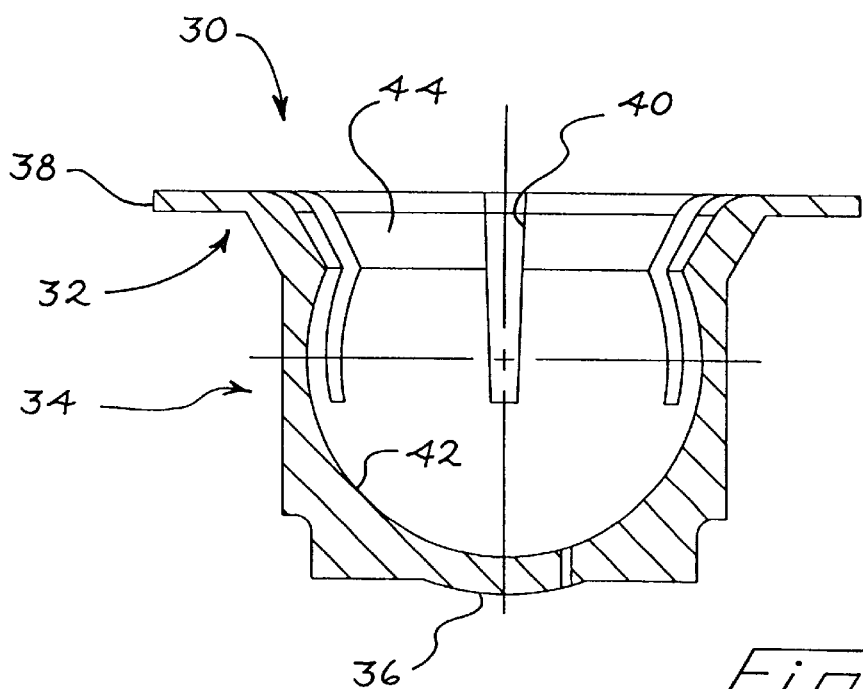
FIG. 5 is a cross-sectional view of the ball socket of FIG. 4.

The first cavity 24 receives a ball socket 30 as shown in FIGS. 4 and 5. The ball socket 30 includes a top portion 32, a sidewall portion 34 and a bottom portion 36. The top portion 32 defines an outwardly extending annular flange 38 and an array of slots 40 that extend partially into the sidewall portion 34. The sidewall portion 34 and the bottom portion 36 cooperate to form a spherical recess 42, and the bottom portion 36 seals and strengthens the lower portion of the ball socket 30. The top portion 32 of the ball socket 30 defines a first annular surface 44 that faces the ball stud in the assembled arrangement.

Figure 6:
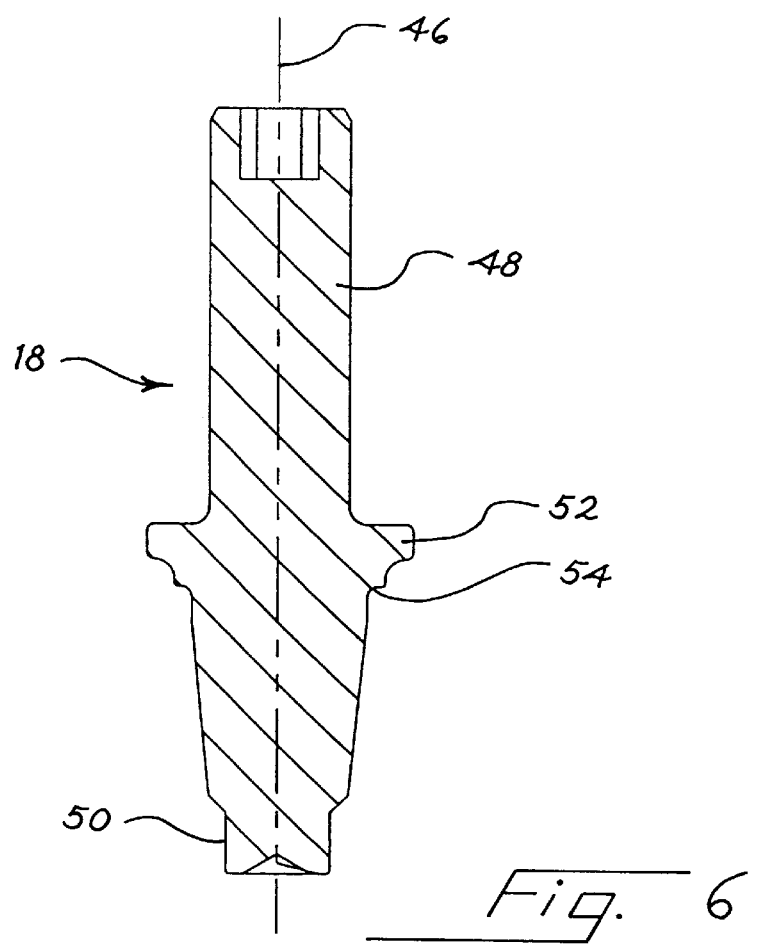
FIG. 6 is a cross-sectional view of one of the ball stud stems included in the embodiment of FIG. 1.

FIG. 6 shows a cross-sectional view of the stem 18 of the ball stud. The stem 18 defines a longitudinal axis 46, a threaded portion 48, and an end portion 50. Intermediate the threaded portion 48 and the end portion 50, the stem 18 forms an integral raised annular flange 52 that terminates on one side in a shoulder 54. The stem 18 is preferably formed of a high-strength material such as steel. The ball stud stem 18 is well suited for fabrication using low cost, high quality, cold-forming processes.

Figure 7:
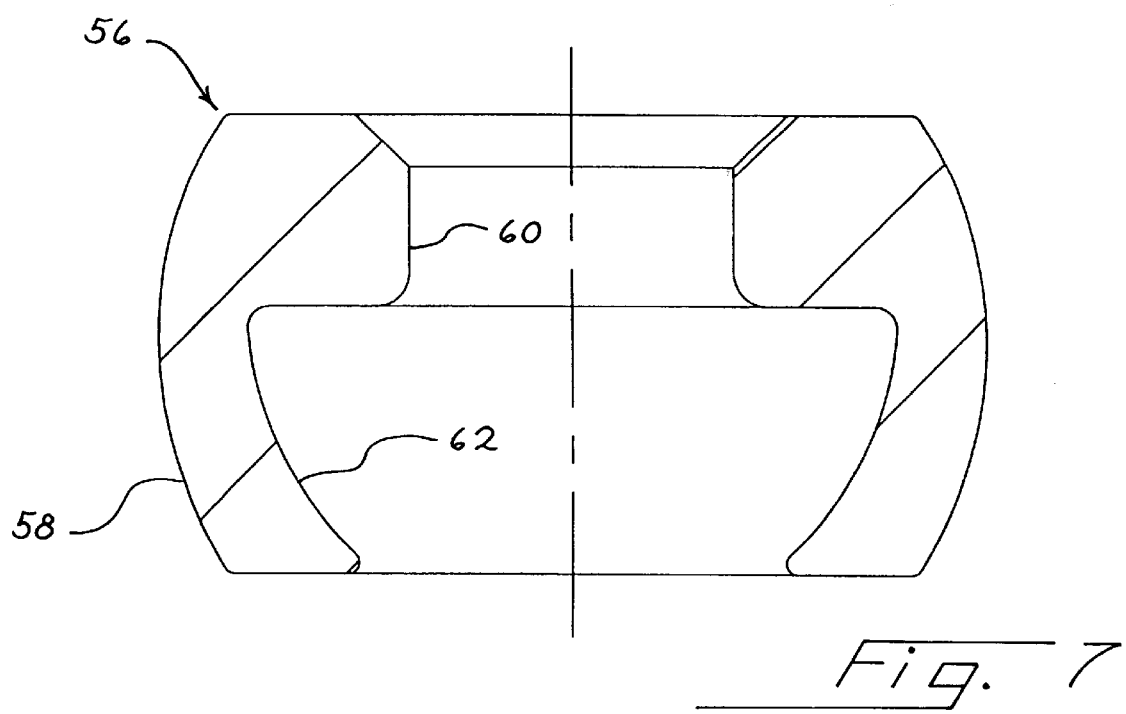
FIG. 7 is a cross-sectional view of one of the ball stud ball portions included in the embodiment of FIG. 1.

As shown in FIG. 7, the ball stud also includes a ball portion 56 that defines a spherical outer surface 58, a central opening 60 and a recess 62. The recess 62 lightens the ball portion 56, and both ends of the opening 60 are preferably provided with a respective chamfer or radius. As used herein, the term "spherical surface" is intended broadly to encompass surfaces that extend over only a portion of a sphere, such as the outer surface 58.

FIG. 8 shows a portion of the link 22 prior to assembly. The link 22 includes an end 64 that includes a knurled surface 66 that provides an irregular shape. The end 66 also includes a chamfer 68. By way of example, the knurled surface 66 can include a 45° male diamond knurl that is raised by 0.36 to 0.48 mm and includes 18–22 grooves per inch. The link 22 is preferably tubular, and it can be formed of an aluminum tube, FIG. 9 shows a cross-sectional view of one of the ball joints 12 in its assembled condition. In order to assemble the ball joint 12, the ball stud 16 is first assembled by placing a washer 70 on the shoulder 54 and crimping the stem 18 to hold the washer 70 in place. This forms a two-part assembly that defines a groove 72 between the washer 70 and the ridge or flange 52.

The next step in assembling the ball stud 16 is to press fit the ball portion 56 on the stem end 50 until the ball portion 56 is firmly seated against the adjacent shoulder of the stem 18. Then the end portion 50 is upset, as for example with a riveting operation, to secure the ball portion 56 in place.

The ball stud 16 is then assembled with the ball socket 30 by snapping the ball portion 56 into the ball socket 30. The slots 40 (FIGS. 4–5) allow the top portion 32 to expand radially to facilitate this assembly.

Then the ball socket 30 is pressed into the first cavity 24 of the housing 14 and an ultrasonic weld joint 74 is formed between the housing 14 and the bottom portion 36 of the ball socket 30. Note that the weld joint 74 and the threaded portion 48 are on opposite sides of a plane P that passes through the center line of the link 22 and the ball portion 56. This places the weld joint 74 in a relatively low-stress region of the housing 14 and in this way improves the strength of the assembly. The closed bottom portion 36 seals the ball socket 30 and adds to the strength of both the ball socket 30 and the weld joint 74.

At any time after the ball portion 56 has been snapped into the ball socket 36, an annular seal 76 can be installed between the ball stud stem 18 and the ball socket 30. The annular seal 76 includes an inner portion 78 that is adhered to the ball stud stem 18 and an outer portion 80 that is adhered to the ball socket 30. The outer portion 80 defines a second surface 82 that is radially outwardly facing and that is directly adhered to the radially inwardly facing first surface 44. Note that the first surface 44, the ball portion 56, and the ball stud stem 18 cooperate to form a trough 84.

The annular seal 76 is shaped as an annular disk oriented parallel to a plane transverse to the longitudinal axis 46. The seal 76 can be formed by flowing a liquid polymer gel into the trough 84 and then curing the polymer gel to cause it to adhere to both the first surface 44 of the ball socket 30 (and therefore to the housing 14) and to the ball stud stem 18. The annular seal 76 is stretchable, and preferably has an elongation limit of greater than 50%. When properly chemically adhered, the annular seal 76 forms a hermetic seal which is expected to offer improvements over mechanical, surface pressure sealing joints. As the ball stud 16 articulates in the housing 14, the annular seal 46 elongates and compresses such that it provides a weather-tight seal and remains adhesively secured both to the ball socket 30 and the ball stud stem 18.

The boot 20 includes an inner sealing surface 86 and an outer sealing surface 88. The outer sealing surface 88 is sealed against the outer surface of the housing 14 and held in place by a retaining ring 90 which may be of steel or a suitable polymer. The inner sealing surface 86 defines an annular ridge 92 shaped to fit within the groove 72. The inner sealing surface 86 is held in place by another retaining ring 94, which also may be formed of steel or a suitable polymer.

The housing 14 is preferably assembled to the link 22 by first heating the end 64 to a temperature higher than the softening temperature of the housing 14. The heated end 64 is then pressed into the second cavity 26. Preferably the second cavity 26 is tapered to facilitate this insertion, and the chamfer 68 also assists in centering the end 64 in the second cavity 26. After the end 64 has been pressed into position in the housing 14, the end 64 is held while the softened plastic material of the housing 14 flows into the knurled surface 66 to form a strong mechanical joint.

Figure 10:
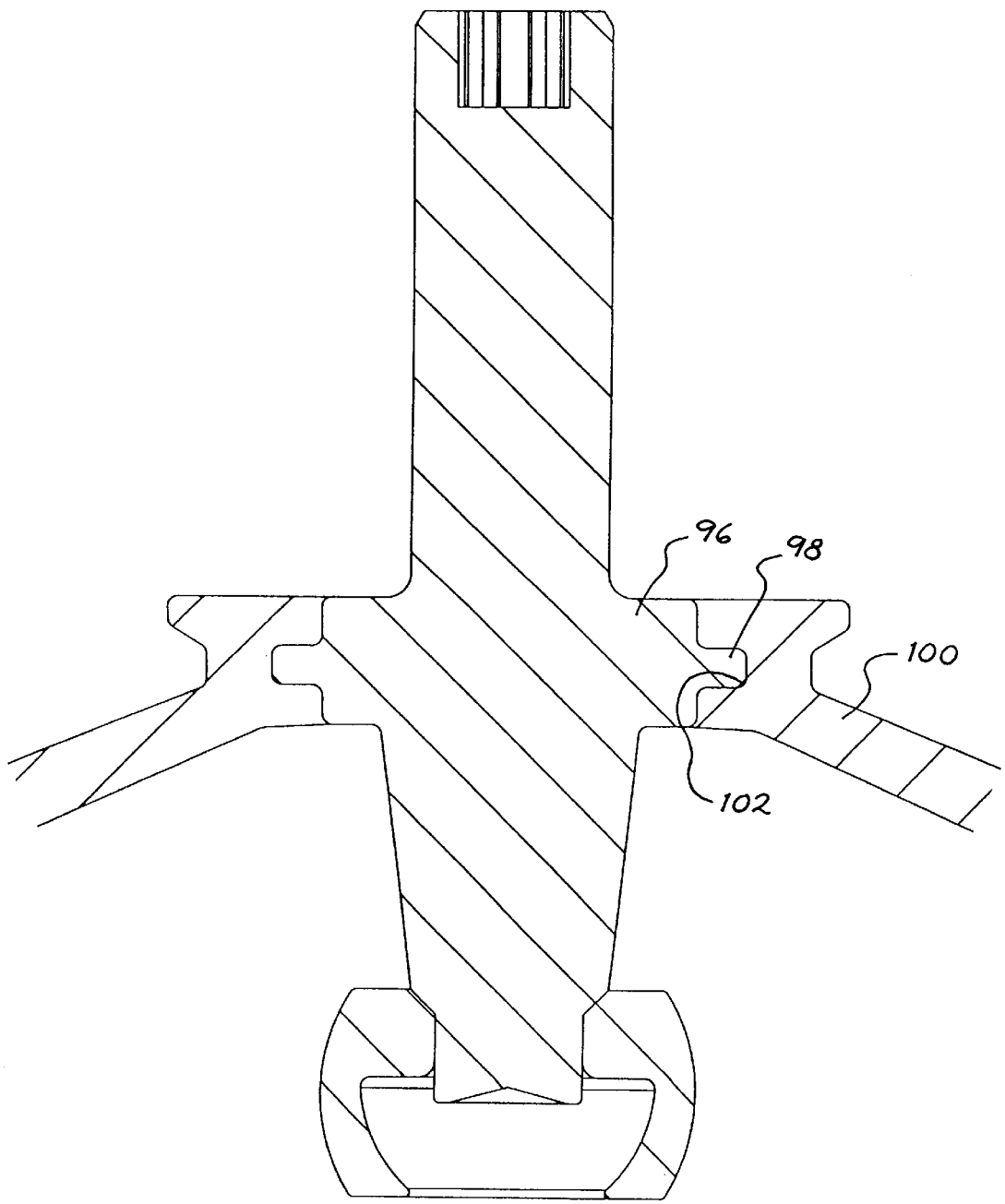
FIG. 10 is a cross-sectional view of a portion of an alternative embodiment of the ball stud stem and boot of FIG. 1.

FIG. 10 relates to an alternative embodiment, in which the ball stud includes a flange 96 that defines an annular ridge 98. In this case the boot 100 defines a groove 102 shaped to receive the ridge 98. With this arrangement only a single flange is required on the ball stud stem, a simplification which reduces manufacturing cost.

Simply by way of example, the following materials have been found suitable. The housing 14 can be injection molded from a thermoplastic resin such as 30% glass filled nylon 6/6. The ball socket 30 can be injection molded from a thermoplastic material such as unfilled nylon 6/6. The ball stud stem 18 can be formed of a steel alloy such as 4037 steel (IFI Class 10.9 (RC33-39)). The ball portion 56 can be formed of a metal such as 1008 or 1010 alloy. Preferably the ball stud stem 18 is plated with a material such as zinc that provides corrosion resistance and the ball portion 56 is coated with a material such as Teflon™ that acts as a solid lubricant and provides a low friction surface. The link 22 can be formed of an aluminum alloy such as 6061-T6 (ASTM B210M-95). The preferred knurl for the knurl surface 66 provides a 90° angle between opposite slopes of the knurl to create a sharp diamond knurl. A preferred polymer gel for the annular seal 76 is a urethane resin such as type UR-312 resin (Thermoset Plastics Co., Indianapolis, Ind.).

Preferably, the end of the link 22 is heated to about 600° F. in order to melt the plastic housing material partially and allow it to flow into the knurled tube surface for a strong mechanical joint after the parts cool.

Of course, it should be understood that many changes and modifications can be made to the preferred embodiments described above. For example, any of the improvements described above can be used alone, or in combination with only some of the other improvements. Thus, the improved annular seal described above can be used with other types of ball studs and other types of housings. For example, the annular seal can be adhered directly to the housing in ball joints that do not include a separate ball socket. As used herein, the term "housing" is intended to include a ball socket when a ball socket is used. The improved annular seal can be used with or without a boot. Also, the improved boot retention system of FIG. 10 can be used in any suitable ball joint, including ball joints having other types of ball studs and housings, whether or not the annular seal 76 is used.

As other alternatives, the link 22 can have other cross sectional shapes, and can be formed of other metals or of solid construction. Another alternative is to use a composite rod for the link 22 which is adhesively secured to the housing. Also, adhesive bonding techniques can be used to form the joint 74.

The method steps of assembly described above can be performed in any suitable order. Thus, the link can be assembled with the housing before or after the ball socket is assembled with the housing.

As used herein, the term "chamfer" is intended broadly to encompass a radius.

The foregoing detailed description has discussed only a few of the many forms that the present invention can take. For this reason, this detailed description is intended by way of illustration and not by way of limitation. It is only the following claims, including all equivalents, that are intended to define the scope of this invention.

What is claimed is:

1. A ball joint comprising:
   a housing comprising a ball socket;
   a ball stud comprising a ball portion disposed in the ball socket;
   an annular, stretchable seal comprising an inner portion adhered to the ball stud and an outer portion adhered to the housing;

wherein the ball socket comprises a first surface that surrounds and faces inwardly, toward the ball stud, wherein the outer portion of the seal comprises a second surface that faces outwardly, toward the first surface, and wherein the first surface is adhesively secured to the second surface.

2. The invention of claim 1 wherein the seal comprises a cured polymer gel material.

3. A ball joint comprising:

a housing comprising a ball socket;

a ball stud comprising a ball portion disposed in the ball socket;

an annular, stretchable seal comprising an inner portion adhered to the ball stud and an outer portion adhered to the housing;

wherein the ball stud extends along a longitudinal axis, and wherein the seal comprises an annular disc extending substantially parallel to a plane oriented perpendicular to the axis.

4. The invention of claim 3, wherein the seal forms a hermetic seal between the ball stud and the ball socket.

5. A ball joint comprising:

a housing comprising a ball socket;

a ball stud comprising a ball portion disposed in the ball socket;

an annular, stretchable seal comprising an inner portion adhered to the ball stud and an outer portion adhered to the housing;

a boot secured to the ball stud and the housing, said seal is situated closer to the ball portion than is the boot.

6. A ball joint comprising:

a housing comprising a ball socket;

a ball stud comprising a ball portion disposed in the ball socket;

an annular, stretchable seal comprising an inner portion adhered to the ball stud and an outer portion adhered to the housing;

wherein the seal is characterized by an elongation limit that is greater than 50%.

7. A ball joint comprising:

a housing comprising a one-piece structure comprising both an annular wall extending around a cavity and a bottom wall substantially enclosing the cavity, said annular wall and said bottom wall molded in one piece;

a ball socket disposed in the cavity of the housing;

a ball stud comprising a ball portion disposed in the ball socket;

said ball socket comprising a top portion that extends around the ball stud, a side wall portion, and a bottom portion that cooperate to form a recess that receives the ball portion;

said ball socket secured to the housing by a weld joint located adjacent the bottom portion;

said housing defining a plane that passes through a center of rotation of the ball portion, said top portion and said weld joint securing the ball socket to the housing located on opposite sides of the plane.

8. The invention of claim 7 wherein the bottom portion seals the ball socket.

9. The invention of claim 7 wherein the top portion comprises a flange that extends away from the ball stud beyond the housing.

10. The invention of claim 9 wherein the ball joint further comprises a boot secured to the ball stud and to the housing, said flange assisting in retention of the boot.

11. A ball joint comprising:

a housing comprising a one-piece structure comprising both an annular wall extending around a cavity and a bottom wall substantially enclosing the cavity, said annular wall and said bottom wall molded in one piece;

a ball socket disposed in the cavity of the housing;

a ball stud comprising a ball portion disposed in the ball socket;

said ball socket comprising a top portion that extends around the ball stud, a side wall portion, and a bottom portion that cooperate to form a recess that receives the ball portion;

said ball socket secured to the housing by a joint located adjacent the bottom portion;

said housing defining a plane that passes through a center of rotation of the ball portion, said top portion and said joint securing the ball socket to the housing located on opposite sides of the plane;

wherein the top portion defines an array of slots that extend partially into the sidewall portion to facilitate insertion of the ball portion into the cavity.

12. The invention of claim 11 wherein the slots do not extend into the bottom portion.

13. A ball stud for a ball joint, said ball stud comprising:

a stem comprising a stem end and a shoulder adjacent the stem end;

a hollow ball portion comprising an opening that receives the stem end with the ball portion positioned against the shoulder;

said stem end comprising an upset portion that secures the ball portion in place on the stem, said upset portion disposed entirely within the ball portion;

said ball portion defining a thickness measured along the stem end, said stem end being no more than about one-half the thickness of the ball portion.

14. The invention of claim 13 wherein the ball portion defines at least one recess.

15. The invention of claim 13 wherein the ball portion is relieved around at least one end of the opening.

16. The invention of claim 13 wherein the stem comprises a flange, said flange comprising an outer surface shaped to engage a boot.

17. The invention of claim 16 wherein the flange comprises a washer, wherein the washer and the stem are separate parts, and wherein the washer is secured on the stem by a crimp portion formed by at least one of the stem and the washer.

18. The invention of claim 16 wherein the washer cooperates with a remaining portion of the flange to define a groove therebetween to assist in boot retention.

19. The invention of claim 13 wherein the stem is coated with a first material characterized by corrosion resistance, and wherein the ball portion is coated with a second material, different from the first material, that acts as a solid lubricant.

20. A ball joint comprising:

a housing comprising a ball socket;

a ball stud comprising a ball portion disposed in the ball socket;

an annular, stretchable seal comprising an inner portion adhered to the ball stud and an outer portion adhered to the housing;

wherein the inner portion of the seal comprises an inwardly-facing surface adhered to the ball stud and wherein the outer portion of the seal comprises an outwardly-facing surface adhered to the housing.

21. The invention of claim 20 wherein the seal further comprises an upper surface extending between the inwardly-facing surface and the outwardly-facing surface, and wherein the upper surface is substantially planar.

22. The invention of claim 21 wherein the upper surface lies substantially entirely in a plane oriented substantially transverse to a longitudinal axis of the ball stud.

23. The invention of claim 20 wherein the inwardly-facing surface of the seal is chemically adhered to the ball stud, and wherein the outwardly-facing surface of the seal is chemically adhered to the housing.

24. The invention of claim 23 wherein the seal further comprises an upper surface extending between the inwardly-facing surface and the outwardly-facing surface, and wherein substantially all of the upper surface is exposed to view from a region adjacent the ball stud.

25. A ball joint comprising:

a housing comprising a ball socket;

a ball stud comprising a ball portion disposed in the ball socket;

an annular, stretchable seal comprising an inner portion adhered to the ball stud and an outer portion adhered to the housing;

wherein the seal is shaped as an annular disc oriented substantially perpendicular to a longitudinal axis of the ball stud.

26. The invention of claim 25 wherein the disc includes substantially all of the seal.

27. A ball joint comprising:

a housing comprising a one-piece structure comprising both an annular wall extending around a cavity and a closed bottom wall enclosing and sealing the cavity, said annular wall and said bottom wall molded in one piece;

a ball socket disposed in the cavity of the housing;

a ball stud comprising a ball portion disposed in the ball socket;

said ball socket comprising a top portion that extends around the ball stud, a side wall portion, and a bottom portion that cooperate to form a recess that receives the ball portion;

said ball socket secured to the housing by a joint located adjacent the bottom portion;

said housing defining a plane that passes through a center of rotation of the ball portion, said top portion and said joint securing the ball socket to the housing located on opposite sides of the plane.

28. The invention of claim 27 wherein the joint comprises a weld joint.

\* \* \* \* \*